United States Patent [19]

Hald-Christensen et al.

[11] 4,262,022

[45] Apr. 14, 1981

[54] METHOD FOR PREPARING A FOOD MATERIAL FROM BLOOD

[76] Inventors: Vilhelm Hald-Christensen, Kongebakker 36 1 TV, 4000 Roskilde; Jens L. Adler-Nissen, Norrebrogade 1, 2.sal, 2200 Copenhagen N; Hans S. Olsen, Donnerupvej 5, 2720 Vanlose, all of Denmark

[21] Appl. No.: 9,752

[22] Filed: Feb. 5, 1979

[30] Foreign Application Priority Data

Feb. 6, 1978 [GB] United Kingdom ............... 04619/78

[51] Int. Cl.$^3$ ............................................... A23J 3/00
[52] U.S. Cl. ...................................... 426/32; 426/647; 426/657
[58] Field of Search ................... 426/32, 56, 647, 657

[56] References Cited

U.S. PATENT DOCUMENTS

| | | | |
|---|---|---|---|
| 1,063,302 | 6/1913 | Thompson | 426/56 X |
| 2,241,868 | 5/1941 | Reimann | 426/647 X |
| 2,958,630 | 11/1960 | Keil et al. | 426/32 X |
| 3,397,991 | 8/1968 | Johnson | 426/656 |
| 3,891,770 | 6/1975 | Sato et al. | 426/32 |
| 4,098,780 | 7/1978 | Lindroos | 426/647 X |

OTHER PUBLICATIONS

Fruton, J. S. et al., "General Biochemistry", John Wiley & Sons, Inc., New York, 1953, pp. 600–601.

*Primary Examiner*—Robert A. Yancoskie
*Attorney, Agent, or Firm*—Fidelman, Wolffe & Waldron

[57] ABSTRACT

A material based on blood, in which the red corpuscle fraction has been partially proteolytically hydrolyzed and thereby decoloured, to be used as an additive to food products, especially meat, due to the nutritional and functional properties of this material.

19 Claims, 2 Drawing Figures

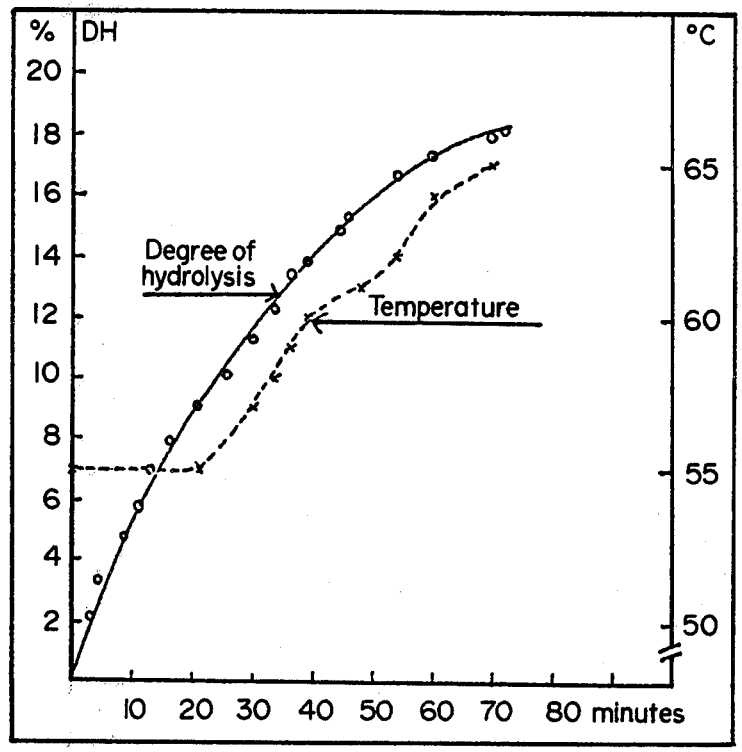
Fig. 1. Degree of hydrolysis (DH) and temperature measured during the enzymatic hydrolysis. (Example I).

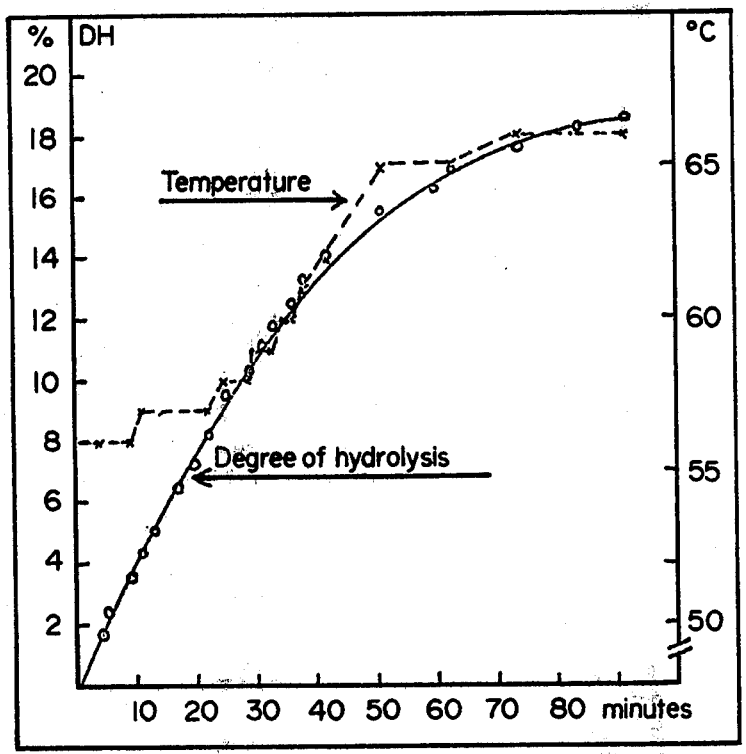
Fig. 2 Degree of hydrolysis (DH) and temperature measured during the enzymatic hydrolysis. (Example 2).

METHOD FOR PREPARING A FOOD MATERIAL FROM BLOOD

Blood has for years appeared as a by-product in the meat industry and has mainly been used as a base for fodder, but only to a smaller degree for human consumption.

Due to the deficiency of cheap protein in the world it would be desirable to be able to utilize the entire protein content in blood for human consumption to a higher extent, and consequently numerous methods for treating blood have been proposed to overcome the various inconveniences associated with blood proteins, of which the most essential is the dark colour of haemoglobin.

It has been described that stabilized blood can be separated into two fractions by centrifugation, i.e. the plasma fraction which constitutes around 60 volume-% and the red blood corpuscle fraction which constitutes around 40 volume-%. The plasma fraction does not impart an undesired colour when added to meat products, whether whole or minced, and also it has somewhat acceptable funtional properties with respect to gelling, emulsifying and water-binding ability, though often with a tendency to produce almost too firm products. However, the blood-plasma only contains around 25% of the protein content in blood whereby the remaining 75% of the protein resides in the red blood corpuscle, the colour of which will show up in the final product to an undesirable extent if added even in relatively very minute amounts. For that reason, several methods have been proposed to remove the haem part from the haemoglobin-protein in the red blood corpuscles.

The above given figures describing the distribution of the protein on the plasma fraction and the red blood corpuscle fraction only represent average values.

As a certain amount of plasma is always present in the red blood corpuscle fraction, depending on the efficiency of the separation, the transition between whole blood and the red blood corpuscle fraction is somewhat floating.

The present invention is based on the discovery that the red blood corpuscle fraction which is modified by a specific partial enzymatic hydrolysis do not colour the final food products, to which it is added, and simultaneously also possesses certain functional properties and to a high degree exhibit the same nutritional protein value as the original fraction.

Thus, according to the invention there is provided a method for production of a material based on blood and suited for addition to a food product, wherein a red blood corpuscle fraction is haemolyzed and subsequently partially hydrolyzed to a degree of hydrolysis (DH) of at least 10 by means of a proteolytic enzyme, whereafter the enzyme is inactivated and the sludge separated from the supernatant at a pH above 4.0, whereafter the supernatant may be carbon treated.

The raw material used in the method according to the invention is blood or the red blood corpuscle fraction. It is to be understood that all kinds of animal blood can be used, e.g. porcine, ovine or bovine blood, and that the blood has to be treated in any conventional way in order to appear as a suitable raw material for human consumption. Thus, the blood may be defibrinated, an anticoagulating agent may be added to be blood or the blood may be coagulated and homogenized.

The material produced by means of the method according to the invention is excellently suited as an additive to food products, especially as an ingredient for production of a curing brine for injection, tumbling, massaging or other kind of incorporation into meat products, particularly due to the high solubility of the material in solutions containing salts in high concentrations over a wide pH range. The general method for producing of such curing brine is described e.g. in British Pat. No. 1,462,329.

The degree of hydrolysis (abbreviated DH) is defined by the equation $$DH = \frac{\text{Number of peptide bonds cleaved}}{\text{Total number of peptide bonds}} \times 100\%$$

Reference is made to J. Adler-Nissen. J. Agric. Food Chem. Vol. 24, No. 6, (1976) page 1090–1093, where a more detailed discussion of the definition of DH appears.

The number of the peptide bonds cleaved can be measured by means of the ninhydrin method. The ninhydrin method is described in Moore, S., Stein, W. H., "Photometric Ninhydrin Method for use in the Chromatography of Amino Acids", J. Biol. Chem., 176, 367–388 (1948).

The DH can also be determined if the course of hydrolysis is followed by means of the pH-STAT method, as described in Jacobsen, C. F., Leonis, J., Linderstrom-Lang, K., Ottesen, M., "The pH-STAT and its use in Biochemistry", in Glick, D, (edit.), "Methods of Biochemical Analysis", Vol. IV, pp. 171–210, Interscience Publishers Inc., New York (1957).

It appears from the above that the DH plays an important role in the invention, inasmuch as the hydrolysis is controlled by means of the DH: only when DH has reached a critical value, the hydrolysis may be terminated. The DH is, so to speak, the main parameter of the hydrolysis. In case the DH is below 10 the supernatant is not decolourized.

Also, at a pH value below 4.0 after the inactivation, the separation of sludge from the hydrolyzate is difficult, and decolourization is difficult to obtain.

Even if it is described by Stachowitcz et al. (ACS Symposium Series, No. 47, Enzymes in food and beverage processing, 1977, p. 295–303) that the red blood corpuscle fraction of blood may be hydrolyzed enzymatically on a laboratory scale by means of methods, which would be costly if scaled up to an industrial scale and even if it is also described in British Pat. No. 1,462,329 that hydrolyzed animal proteins in general may be used as a basis for a composition suited for incorporation in meat, notably without any details being given in regard to e.g. undesired colour or solubility, it is surprising that the material produced according to the invention has so little colour intensity and is so well suited for addition to food products, that it is now possible to utilize the entire amount of blood from the slaughterhouses for human consumption, whereas it has hitherto not been possible to utilize blood for human consumption to any significant extent.

A preferred embodiment of the method according to the invention comprises that the supernatant from the treated red blood corpuscle fraction is combined with blood plasma. As hydrolyzates primarily are characterized by a high degree of solubility, a high emulsifying capacity, a non-existing gelling ability and therefore a low water binding capacity the desired functional properties are improved by combining the two fractions. In this way the excellent gelling and binding capacity of the plasma fraction is combined with the high degree of solubility and emulsifying properties of the decoloured and protein rich hydrolyzate. By this embodiment, the entire blood can be used for human consumption. However, by varying the proportion between the two fractions it is possible to obtain combined blood protein compositions which may be tailored to a specified application, such as whole meat, minced meat, sausage production, curing brines, etc. However, for certain applications, e.g. for injection into meat, it is not necessary or even desirable to combine the hydrolyzed fraction with plasma fraction, because any such combination would add a high molecular material which would raise the viscosity and impair the distribution of the material throughout the meat.

A preferred embodiment of the method according to the invention comprises that blood is fractionated into a red blood corpuscle fraction and a blood plasma fraction, the red blood corpuscle fraction is haemolyzed and subsequently partly hydrolyzed to a DH of a least 10 by means of a proteolytic enzyme, whereafter the enzyme is inactivated and the sludge separated from the supernatant at a pH above 4.0, whereafter the supernatant may be carbon treated, and the supernatant from the treated red blood corpuscle fraction is combined with blood plasma. By this embodiment it is made possible as the raw material to utilize whole blood originating from the slaughterhouses, this being an easily accessible and cheap raw material.

A preferred embodiment of the method according to the invention comprises that the starting material is blood to which an anticoagulating agent has been added, whereby the anticoagulating agent is trisodium citrate or a phosphate salt. With this embodiment no protein is removed from the blood as when a defibrinated blood is used as the raw material.

A preferred embodiment of the method according to the invention comprises that the blood fractionation is performed by means of a centrifuge. This is a fast and efficient way of fractionating the blood on an industrial scale. The blood is separated into a red blood corpuscle fraction with a protein content of approx. 35% and a plasma fraction with a protein content of approx. 7%, i.e., 75% of the proteins in the blood resides in the red cell fraction. The protein referred to is calculated as the percentage of nitrogen (N) measured according to Kjeldahl multiplied by 6.25.

A preferred embodiment of the method according to the invention comprises that the haemolysis is performed by addition of water with a volume of 2–5 times the volume of the red blood corpuscle fraction, whereby the red blood corpuscle fraction may be frozen before or after the dilution with water, preferably flake frozen. In this way both a haemolysis and a dilution takes place, and also, the storage stability is improved. The dilution is advantageous, because the later performed hydrolysis is difficult to carry out in the undiluted (viscous) red blood corpuscle fraction. The haemolysis also can be carried out by mechanical treatment. By further adjustment of the pH value a blood cell haemolysate is obtained, which constitutes a suitable substrate for proteolytic enzymes, whereby the haemolysate contains between 8–20% protein. The cell material, such as membranes or cell walls, might be removed from the substrate prior to the hydrolysis either by centrifugation or by precipitation with $CHCl_3$.

A preferred embodiment of the method according to the invention comprises that the proteolytic enzyme was produced microbially by means of *Bacillus licheniformis*. A preferred example of such proteolytic enzyme is the commercial product ALCALASE ® (subtilisin Carlsberg) produced by Novo Industri A/S. This enzyme is able to split the protein along the protein chain with such high hydrolysis rates that the minimum value of DH is quickly reached.

A preferred embodiment of the method according to the invention comprises that the hydrolysis is performed to an extent corresponding to a DH value of between 14 and 22. In this DH interval a satisfactory decolourization is achieved.

A preferred embodiment of the method according to the invention comprises that the hydrolysis is performed at pH 7–10 and with an enzyme activity of between 6 and 60 Anson units per kg of protein. The enzyme activity referred to above in terms of Anson units is determined according to the modified Anson method described in NOVO ENZYME INFORMATION IB no. 058 e-GB (the original Anson method is described in J. Gen. Physiol., 22, 79–89 (1939)). The proteolytic activity thus is a critical parameter in the hydrolysis: if the proteolytic activity falls below 6 Anson units per kg of blood corpuscle protein, the hydrolysis rate is so slow, that the reaction time is unsatisfactorily long, and the economy of the plant will be unattractive; if, on the other hand, the proteolytic activity is above 60 Anson units per kg of blood corpuscle protein, the enzyme cost will be too high, and the economy of the plant will be unattractive. At a high pH value of around 10, the hydrolysis rate is relatively high, but on the other hand, a relatively high amount of acid has to be added at the later inactivation stage if enzyme inactivation is performed by pH adjustment. At a low pH value of around 7, the hydrolysis rate is relatively low, but, on the other hand, a relatively low amount of acid has to be added at the later inactivation stage.

A preferred embodiment of the method according to the invention comprises that the pH is kept approximately constant during hydrolysis by addition of a base. In this way the hydrolysis is easily controlled and it can be carried out in a reproducible way by means of a thermostatic pH-state. The haemolysate-substrate is heated to the desired process temperature, which might be between 45° and 65° C. and preferably between 50° and 55° C.

A preferred embodiment of the method according the the invention comprises that the temperature of the hydrolyzing mixture is raised during the last part of the hydrolysis. In this way the normal DH-time-curve for a fixed temperature is straightened out to a curve approximating a straight line, i.e. the reaction rate is kept approximately constant during the hydrolysis. The reaction is speeded up, which is advantageous seen from a food-microbial point of view, as growth of unwanted microbes is eliminated or inhibited.

A preferred embodiment of the method according to the invention comprises that the temperature of the hydrolyzing mixture is around 55° C. during the first half of the hydrolysis, whereafter the temperature gradually is raised to around 65° C. during the last half of the hydrolysis. In this way the normal DH-time-curve for a fixed temperature is straightened out to a curve approximating a straight line, i.e. the reaction rate is kept approximately constant during the hydrolysis. The reaction is speeded up, which is advantageous seen from a food-microbial point of view, as growth of unwanted microbes is eliminated or almost completely eliminated.

All the conditions in the hydrolysis should suit the applied enzyme or enzyme combination, if such combination should be feasible, but these conditions such as temperature, pH, concentration of substrate, ratio between enzyme(s) and substrate and the degree of hydrolysis should be optimized not only with respect to the maximum reaction velocity, but also wiht respect to the maxihydrolysis and thereby the decolourization.

A preferred embodiment of the method according to the invention comprises that the inactivation of the proteolytic enzyme is carried out by pH reduction, preferably by citric acid or hydrochloric acid. Citric acid provides a better decolourization for a given DH. Use of hydrochloric acid is cheap and exhibits the further aspect of generating NaCl after neutralization with NaOH; this is an advantage because NaCl is a normal constituent of curing brines anyway. Besides the inactivation the pH adjustment will effect a precipitation of coloured, not hydrolyzed proteins. Preferably the hydrolysis is terminated by inactivation of the enzymes by lowering the pH below 4.2. Other suitable acids are acetic acid, malic acid, or phosphoric acid.

A preferred embodiment of the method according to the invention comprises that the inactivation of the proteolytic enzyme is carried out by treatment at elevated temperatures. In this way no addition of auxiliary agents is needed.

A preferred embodiment of the method according to the invention comprises that the separation of the sludge from the supernatant is performed by means of a centrifuge, preferably at a pH value below 5.0 and at elevated temperatures. From an industrial point of view, a centrifuge is the most relevant solution. A solid ejecting centrifuge is most preferred; also, a temperature of around 65° C. is preferred. If the pH value is below 5.0 (and above 4.0) an exceptionally good decolourization is obtained. The said supernatant has a volume between 60 and 80% of the initial volume of haemolyzate.

A preferred embodiment of the method according to the invention comprises that a carbon treatment is performed, this carbon treatment consisting in an intimate mixing of the supernatant with an amount of activated carbon of between 8 and 33% (w/w) of the weight of the protein present with subsequent removal of the carbon from the supernatent. This amount of activated carbon usually corresponds to around 0.5 to 2% (w/w) of the centrifuged supernatant. Hereby a further decolourization and removal of off-flavors is obtained. Preferably an activated carbon in powder form is used. The temperature during the inactivation and the decolourization by carbon is generally maintained at 30° to 60° C. The treatment with carbon normally lasts from 10 to 60 minutes, whereafter the carbon is removed by centrifugation or filtration. In industrial scale filtration is preferred. The activated carbon can be any activated carbon with high absorptive power, for example Coporafin B.G.N. from Lurgi Apparate-Technik G.m.b.H., Frankfurt a.M.

A preferred embodiment of the method according to the invention comprises that the carbon treatment is performed at a pH value between 2.5 and 4.5, preferably about 3. Hereby a maximal decolourization is obtained.

A preferred embodiment of the method according to the invention comprises that the carbon treated, carbon free supernatant is concentrated by reverse osmosis, preferably to a protein concentration of 15–25%. Hereby the drying costs are cut down in case a solid product is wanted. A solid product is advantageously used due to the better storage stability.

A preferred embodiment of the method according to the invention comprises that the carbon treated, carbon free supernatant is concentrated by vacuum evaporation in a falling film evaporator, preferably to a protein concentration of 30–40%. Hereby drying costs are cut down in case a solid product is wanted. A solid product is advantageously used due to the better storage stability.

A preferred embodiemnt of the method according to the invention comprises that the blood plasma fraction is concentrated. This concentration should be carried out carefully, in order not to denature the native proteins. Hereby the drying costs are cut down in case a solid product is wanted. A solid product is advantageously used due to the better storage stability.

A preferred embodiment of the method according to the invention comprises that the (combined) material is spray dried. This is a simple way of obtaining a solid material on an industrial scale. A solid material has a better microbial stability than a fluid product.

A preferred embodiment of the method according to the invention comprises that the (combined) material is flake frozen. This is a simple and cheap way of obtaining a frozen material on an industrial scale. A frozen product has a better microbial stability than a fluid product. Furthermore, a flake frozen product can be distributed more rapidly in the final curing brine than a block frozen product. The flake frozen product is more homogeneous and causes less protein denaturation than a block frozen product. Another advantage of this embodiment is the cooling effect during production of meat emulsions.

The invention also provides a material for addition to food products, whenever prepared by the process according to the invention. It has been found that the thus obtained materials are suitable as enriching additives for food products, including red meat, white meat and fish meat.

A preferred embodiment of the material according to the invention also contains a partially hydrolyzed vegetable protein. In case the material according to the invention should exhibit a small deficiency in relation to a specific property this discrepancy might be compensated for by the admixture of a hydrolyzed vegetable protein.

A preferred embodiment of the material according to the invention contains a partially hydrolyzed soy protein. In case the material according to the invention should exhibit a small deficiency in relation to a specific property this discrepancy might be compensated for by the admixture of a hydrolyzed soy protein, e.g. as prepared as indicated in Belgian patent no. 850,478.

In order to further illustrate the invention reference is made to following examples.

EXAMPLES

Example 1

To 312.2 kg of fresh drawn porcine blood was added 4.75 liters of a 40% solution of trisodium citrate. This stabilized blood was cold centrifuged in an Alfa Laval BPM 209-70 H separator and thereby separated into 206.0 kg of plasma fraction and 110.9 kg of red blood corpuscle fraction.

The red blood corpuscle fraction was haemolyzed by addition of 376.2 kg of water, and this mixture was heated to 55° C. 2.06 liters of 4.0 N NaOH was used to adjust pH to 8.50 before the enzyme was added.

1.56 kg of ALCALASE 0.6 L (0.66 Anson units/g) was diluted with 2.0 liters of water and added to the haemolyzed blood fraction. Thereby an enzyme activity of 26.4 Anson units pr. kg protein was obtained. During the hydrolysis pH was kept constant at 8.50 by addition of 4 N NaOH using the pH-stat technique, and DH was calculated on the basis of the base consumption B by means of the folowing relationship:

$$DH = B \times \frac{1}{\alpha} \times \frac{N_B}{MP} \times \frac{1}{h_{tot}} \times 100\%$$

where
B = Consumption of base in liter $$\alpha = \text{Degree of dissociation} = \frac{10^{pH-pK}}{1 + 10^{pH-pK}}$$

pK is the pK value for the $\alpha$-NH$_2$ groups and is assumed to be 7.0. (the value $1/\alpha = 1.03$ was used)
$N_B$ = The normality of the base
MP = The mass of protein (N×6.25) in kg
$h_{tot}$ = The total number of peptide bonds in equivalents per kg protein. (The value $h_{tot} = 8.38$ eqv/kg (N×6.25) was used).

During the hydrolysis the temperature was raised from 55° C. to 65° C. using the temperature-time relationship shown in FIG. 1. In FIG. 1 the DH-time relationship is also shown.

Following a consumption of 14.2 liters of 4 N NaOH DH reached a value of 18.1. Then the hydrolysis was terminated by adjustment of pH to 4.0 by means of 11.5 l of conc. HCl, and the hydrolyzed mixture was maintained at 65° C. for 60 minutes in order to inactivate the enzyme. Then the pH value was adjusted to 4.5 by means of 0.8 liters of 4 N NaOH and the hydrolyzed mixture was then clarified at 65° C. on a solids-ejecting centrifuge (Westfalia type SB 7-35-076). Thereby the hydrolyzed mixture was separated into 327 kg of supernatant and 196 kg of sludge. 2½% of sludge material was found in the supernatant after centrifugation in 5 minutes at 3000×g in a table centrifuge.

The supernatant was filtered on a plate-and-frame filter press (Seitz Orion OF 40 V) equipped with asbestos fibre filter precoated with diatomaceous earth (High Flow Supercell). 300 l of filtrate was obtained.

The filtrate was adjusted to pH 3.0 by means of 3 l of 6 N HCl, and 3 kg of activated carbon (BGN-Lurgi) was added. The mixture was kept stirred for 60 minutes at 55° C. and then filtered in the above-mentioned filter press, but without filter aid. 300 l of filtrate was obtained (water was used to displace the liquid in the filter).

The "polished" hydrolyzate was then concentrated by hyperfiltration (reverse osmosis) at 30° C. using a 40 cm plate-and-frame unit manufactured by De Danske Sukkerfabrikker A/S). The membranes were of cellulose acetate (type DDS 900), and an average pressure of 30 kp/cm² was generated by a Rannie piston pump. The module had a membrane area of 5.5 m². By this process 90 kg of concentrate, having a protein concentration of 22.1% (N×6.25) and a pH-value of 3.4, was collected.

The 90 kg of concentrated hydrolyzed blood corpuscle protein was neutralized using 8.88 kg of 6.0 N NaOH. Then the 206.0 kg of plasma, which had been separated from the porcine blood was combined with the hydrolyzate and the obtained 305 kg of decoloured blood material was then spray-dried in a Niro Production Minor. In table 1 the protein yields are shown for each step of the whole process. The final protein yield based on the amount of whole blood treated is thus found to be 63.9%. Reference is made to table 1.

TABLE 1

Protein content, mass of fractions and protein yields based on whole blood protein and on blood corpuscle protein.

| Process step or material | % N × 6.25 | Mass of fraction, kg | Protein yield based on whole blood (%) | Protein yield based on red blood corpuscle fraction (%) |
|---|---|---|---|---|
| Whole blood | 17.4 | 312.2 | 100 | — |
| Blood corpuscle fraction | 35.2 | 110.9 | 71.9 | 100 |
| Plasma | 7.5 | 206.0 | 28.4 | — |
| Blood corpuscle | | | | |
| After hydrolysis | 7.7 | 523.8 | 74.2 | 103.3 |
| Supernatant | 6.80 | 327 | 40.9 | 57.0 |
| Clarified supernatant | 6.63 | 300 | 36.6 | 51.0 |
| Sludge | 7.37 | 196 | 26.6 | 37.0 |
| Carbon treated supernatant | 6.50 | 300 | 35.9 | 50.0 |
| concentrated hydrolysate (reverse osmosis) | 22.1 | 90 | 36.6 | 51.0 |
| Neutralized concentrate | 20.1 | 98.9 | 36.6 | 50.9 |
| decoloured blood after combination | 11.6 | 305.0 | 65.1 | — |
| Spraydried decoloured blood | 78.4 | 44.3 | 63.9 | — |

Example II

To 77.2 kg of fresh drawn porcine blood was added 1.2 kg of a 40% solution of trisodium citrate. This stabilized blood was cold centrifuged in an Alfa Laval BPM 209-70 H separator and thereby separated into 50.9 kg of plasma and 27.4 kg of red blood corpuscle fraction.

The red blood corpuscle fraction was haemolyzed by addition of 90 liters of water, and this mixture was heated to 55° C. 0.46 liters of 4 N NaOH was used to adjust the pH value to 8.50 before the enzyme was added.

0.397 kg of ALCALASE 0.6 L (0.66 Anson units/g) was diluted with 2.0 liters of water and added to the haemolyzed red blood corpuscle fraction. Thereby an enzyme activity of 26.3 Anson units per kg protein was obtained. During the hydrolysis pH was kept constant at 8.50 by addition of 4 N NaOH using the pH-stat technique, and DH was calculated from the consumption of base B in the same manner as indicated in example I.

The temperature was raised from 55° C. to 65° C. during the hydrolysis. In FIG. 2 the temperature-time relationship and the DH-time relationship is shown.

Following the addition of 3.71 liters of 4 N NaOH DH reached a value of 18.5%. Then the hydrolysis was terminated by adjustment of pH to 4.0 by means of 2.60 liters of concentrated HCl. The thus hydrolyzed fraction was maintained at 65° C. for 60 minutes in order to inactivate the enzyme. pH was then adjusted to 4.5 by means of 0.2 liters of 4 N NaOH and the hydrolysed mixture was then clarified at 65° C. on a solids-ejecting centrifuge (Westfalia type SB 7-35-076). Thereby the hydrolysed mixture was separated into 80.3 kg of supernatant (I) and 48.2 kg of sludge (I). 2.5% of sludge was found in the supernatant after centrifugation in 5 minutes at 3000×g in a table centrifuge.

To the sludge (I) was added 80 liters of water, and the mixture was stirred and heated to 65° C. This mixture was clarified at 65° C. on the above-mentioned centrifuge, and 77.5 kg of supernatant (II) and 51.0 kg of sludge (II) was collected.

Supernatants I and II were collected and filtered on a plate-and-frame filter press (Seitz Orion OF 40 V) equipped with asbestos fibre filter precoated with diatomaceous earth (High flow Super cell). 156 kg of filtrate was obtained. The pH value of this filtrate was adjusted to 3.0 by means of 0.75 liters of 6 N HCl, and 1.6 kg of activated carbon (BGN from Lurgi) was added. The mixture was kept stirred for 60 minutes at 55° C. and then filtered in the above-mentioned filter press but without filter aid. 155 kg of filtrate was obtained.

The "polished" hydrolyzate was then concentrated by hyperfiltration (reverse osmosis) at 20° C. using a 40 cm plate-and-frame unit manufactured by De Danske Sukkerfabrikker A/S. The celluloseacetate membranes were of the type DDS 990 and an average pressure of 30 kp/cm$^2$ was generated by a Rannie piston pump. The module had a membrane area of 5.5 m$^2$. Hereby 35.8 kg of concentrate, having a protein content of 19.5% (N×6.25) and a pH-value of 3.6, were collected. The concentrate was neutralized and spray-dried in a Niro Production Minor using an inlet temperature of 225°–230° C. and an outlet temperature of 95°–100° C., and the spraydried product had a dry matter composition of 75.15% protein (N×6.25) and 23.4% NaCl.

Furthermore, the spray-dried hydrolyzate was solubilized in the plasma fraction giving a decoloured blood protein product. Hereby the protein yield was found to be 75.4%. By comparison of this result with the total protein yield of example I the effect of washing sludge (I) is demonstrated. Reference is made to table 2.

TABLE 2

Mass of fractions, protein content and protein yields based on whole blood and on red blood corpuscle fraction.

| Process step | % N × 6.25 | Mass of fraction (kg) | Protein yield based on whole blood (%) | Protein yield based on red blood corpuscle fraction (%) |
|---|---|---|---|---|
| Whole blood | 17.8 | 77.2 | 100 | — |
| Blood corpuscle | 36.3 | 27.4 | 72.4 | 100 |
| Plasma | 7.5 | 50.9 | 27.8 | — |
| Blood corpuscle | | | | |
| After hydrolysis | 7.46 | 128.5 | 69.8 | 96.4 |
| Supernatant I | 6.57 | 80.3 | 38.0 | 52.6 |
| Sludge I | 7.37 | 48.2 | 25.9 | 35.7 |
| Supernatant II | 2.41 | 77.5 | 13.6 | 18.8 |
| Sludge II | 4.85 | 51.0 | 18.0 | 24.9 |
| Supernatant I + II | 4.50 | 157.8 | 51.7 | 71.4 |
| Filtrate | 4.59 | 156.0 | 52.1 | 72.0 |
| Carbon treated | (4.51) | 155.0 | 50.9 | 70.3 |
| Concentrated | 19.50 | 35.8 | 50.8 | 70.2 |
| hydrolysated | | | | |
| Spraydried hydrolysate | 75.15 | 8.7 | 47.6 | 65.7 |
| Plasma + dried hydrolysate | 17.4 | 59.6 | 75.4 | — |

Because of the low molecular weight the protein hydrolysate by itself (i.e. without any plasma added) was well suited for incorporation into whole meat muscles by injection of a 20% protein solution containing approximately 13% NaCl, 2.5% sodium tripolyphosphate and 0.1% sodium nitrate at a pH of about 7.5.

The combined product ("the decoloured blood") was well suited as an ingredient for production of meat emulsions, sausages and luncheon meat, and the product was found to be an excellent binder.

Example III

To 1830 ml of porcine blood was added 6 g of dry trisodium citrate/l. This stabilized blood was centrifuged in a laboratory centrifuge (MSE Coolspin, type PL 100 A), whereby it has separated to 1130 ml of plasma and 700 ml of a red blood corpuscle fraction.

The red blood corpuscle fraction was haemolyzed by addition of 2248 ml of water. To a total amount of diluted mixture, i.e. 2948 ml was added 10.8 g of ALCALASE 0.6 L (0.67 Anson units/g) dissolved in 40 ml of water, whereby an enzyme activity of 0.0024 Anson units/ml (corresponding to 29.5 Anson units/kg protein) was generated. The temperature was 55° C., and the pH value was kept constant at 8.5 by addition of 22 ml 4 N NaOH using the pH-stat method. During the hydrolysis DH was calculated as indicated in example I. When DH had reached a value of 16.0 the hydrolysis was terminated by adjustment of pH to 4.2 by means of 150 ml 4 N HCl. The sludge was separated from the supernatant by centrifugation in an laboratory centrifuge, yielding 2822 ml of supernatant and 461 g of sludge. The pH value of the supernatent was adjusted to 3.0 by addition of 60 ml of 4 N HCl. The pH adjusted supernatant is treated with 14.4 g of activated carbon (Merck) (0.5%) in 60 minutes at 55° C. The carbon is filtered off by means of a Büchner funnel. The volume of the carbon treated, carbon free supernatant is 2730 ml.

The above 2730 ml of carbon treated, carbon free supernatant containing 64% of the initial amount of protein of the red blood corpuscle fraction is pH adjusted to 7.0 by means of 145 ml 4 N NaOH and is then combined with the above 1130 ml of plasma, whereby a light product with excellent functional properties well suited as an additive to food products appears. Calculated on the original protein content in the 1830 ml porcine blood the yield is 72.8%, as the protein content in the final product was 5.9%.

Example IV

To 30.8 l of porcine blood was added 6 g of trisodium citrate/l. This stabilized blood was centrifuged in an MSE Coolspin centrifuge, whereby it was separated to 19.0 l of plasma and 11.8 l of a red blood corpuscle fraction.

The red blood corpuscle fraction was haemolyzed by addition of 48.2 l of water. To the total amount of diluted mixture, i.e. 50 l was added 160 g of ALCALASE 0.6 L (0.65 Anson units/g), dissolved in 400 ml of water, whereby an enzyme activity of 0.0021 Anson units/ml (corresponding to 25.2 Anson units/kg protein) was generated. The temperature was 55° C., and the pH value was kept constant at 8.5 by addition of 400 ml of 4 N NaOH using the pH-STAT method. During the hydrolysis DH was calculated on the basis of the base consumption using the formulas in example I. In this example the reaction rate was kept approximately constant by gradual increase of the temperature to 60° C. during the reaction. When DH had reached a value of 18.8 the hydrolysis was interrupted by adjustment of the pH value to 4.2 by means of 3.01 kg 4 N HCl. The sludge was separated from the supernatant by centrifugation in a chamber-bowl type clarifier (Westfalia, type KG), which yields 51.1 l of supernatant. The pH value of supernatant was adjusted to 3.0 with 1.38 kg of 4 N HCl. This supernatant is treated by 500 g (1%) of activated carbon in 90 minutes. The carbon is filtered off in a 30 cm Büchner funnel. The volume of the carbon treated, carbon free supernatant is 49 l.

The 49 l of carbon treated, carbon free supernatant containing 62% of the initial protein amount of the red blood corpuscle fraction is pH adjusted to pH 7 by means of 2.2 l of 4 N NaOH. Varying amounts of the thus obtained 51.2 l of hydrolyzate and 19.0 l of plasma were combined in the following ways.

A. 5 l of hydrolyzate were spray-dried to 0.29 kg of a powder with 70.6% of protein and 97% of dry matter. 5 l of plasma were spraydried to 0.38 kg of a powder with 71% of protein and 96% of dry matter. The two powders were mixed.

B, C. In these experiments a certain amount of hydrolyzate and a certain amount of plasma was mixed, whereafter the combined mixture was spraydried, in the below indicated manner.

| Exp. | Volume of hydroly-zate, l | Volume of plasma, l | Weight of spray-dried powder kg | % protein in spray-dried powder | % dry matter in spray-dried powder |
|---|---|---|---|---|---|
| B | 10 | 10 | 1.2 | 70 | 96 |
| C | 1.8 | 3.6 | 0.36 | 71.2 | 97 |

Likewise experiment A was repeated, only the fluids were separately freeze-dried instead of being separately spray-dried.

All four powders were excellently suited for curing brines for tumbling of ham.

What we claim is:

1. A method for producing a decolorized edible material from blood which comprises:
   (a) haemolyzing a red blood corpuscle containing blood fraction;
   (b) then partially hydrolyzing the haemolyzed blood fraction enzymatically with the proteinase of B. licheniformis to a degree of hydrolysis of at least 10, forming thereby a hydrolysate constituted of a decolorized supernatant containing partially hydrolyzed edible protein dissolved therein and a sludge; and,
   (c) thereafter deactivating the proteinase and recovering the supernatant.

2. The method of claim 1 wherein the method commences by separating whole blood into a plasma fraction and a red blood corpuscle fraction.

3. The method according to claim 2 wherein the supernatant from the treated red blood corpuscle fraction is thereafter combined with the plasma fraction.

4. Method according to claim 1 wherein the haemolysis is performed by addition of water with a volume of 2-5 times the volume of the red blood corpuscle fraction.

5. Method according to claim 1, wherein the hydrolysis is carried out to a DH between 14 and 22.

6. Method according to claim 1, wherein the hydrolysis is performed at pH 7-10 and with an enzyme activity of between 6 and 60 Anson units per kg of protein.

7. Method according to claim 6, wherein the pH is kept approximately constant during the hydrolysis by addition of a base.

8. A method according to claim 1, wherein the hydrolyzing mixture is maintained at a constant temperature level during the first half of the hydrolysis and thereafter is raised during the last half of the hydrolysis.

9. Method according to claim 8, wherein the temperature of the hydrolyzing mixture is around 55° C. during the first half of the hydrolysis, whereafter the temperature gradually is raised to about 65° C. during the last half of the hydrolysis.

10. The method according to claim 1 wherein the inactivation of the proteolytic enzyme is carried out by addition of acid to the hydrolysate.

11. A method according to claim 1, wherein the inactivation of the proteolytic enzyme is carried out by heating the hydrolyzate.

12. A method according to claim 1 which further comprises intimately mixing the supernatant with an amount of activated carbon of between 8 and 33% of the weight of the protein present to further treat said supernatant and subsequently removing the carbon from the supernatant.

13. Method according to claim 12, wherein the carbon treatment is performed at a pH value between 2.5 and 4.5.

14. A material for addition to food products, prepared by the process according to claim 1.

15. The process of claim 6 wherein the supernatant recovery process comprises adjusting the pH of the hydrolysate to the range of pH 4-5, and thereafter separating the sludge from the supernatant.

16. A method for producing a decolorized edible material from blood which comprises:
   (a) haemolyzing a red blood corpuscle containing blood fraction;
   (b) then hydrolyzing the haemolyzed blood fraction to a degree of hydrolysis in the range of 14-22 at pH 7-10 with the proteinase of B. licheniformis, forming thereby a hydrolysate constituted of a decolorized supernatant containing partially hydrolyzed edible protein dissolved therein and a sludge;
   (c) thereafter deactivating the proteinase;
   (d) followed by subjecting the hydrolysate to a pH 4-5, and then separating the sludge from supernatant to recover the supernatant.

17. The method of claim 16 wherein the proteinase is deactivated by adding acid to the hydrolysate.

18. The method of claim 16 wherein hydrolysis is carried out with a proteinase concentration of 6-60 Anson units per kg of protein.

19. The method of claim 16 wherein the supernatant is then further treated contacting the supernatant at pH 2.5-3.5 with activated carbon, followed by removing the carbon therefrom.

* * * * *